Sept. 10, 1935.                E. L. COLE                 2,014,039
                       LIGHT CONTROLLING APPARATUS
                         Filed May 5, 1934           2 Sheets-Sheet 1
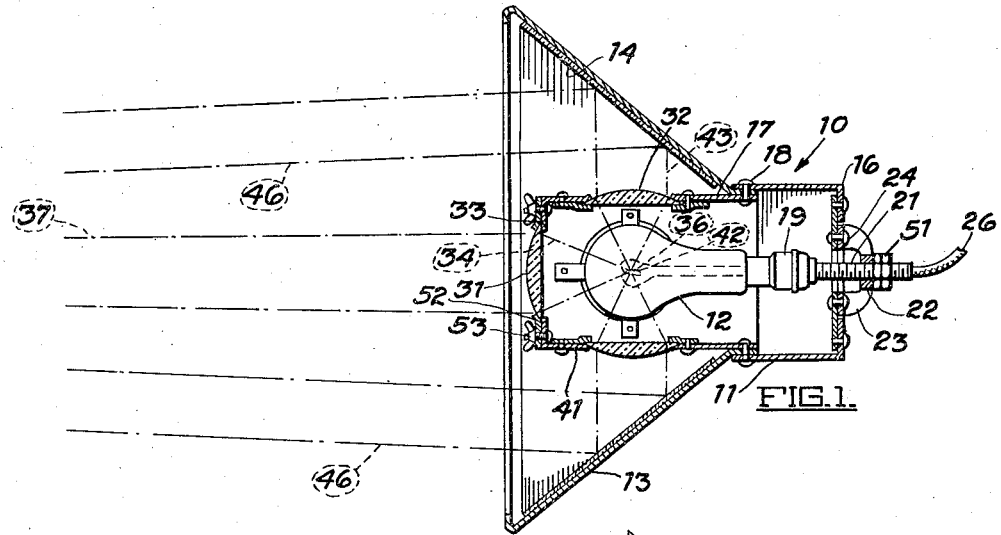
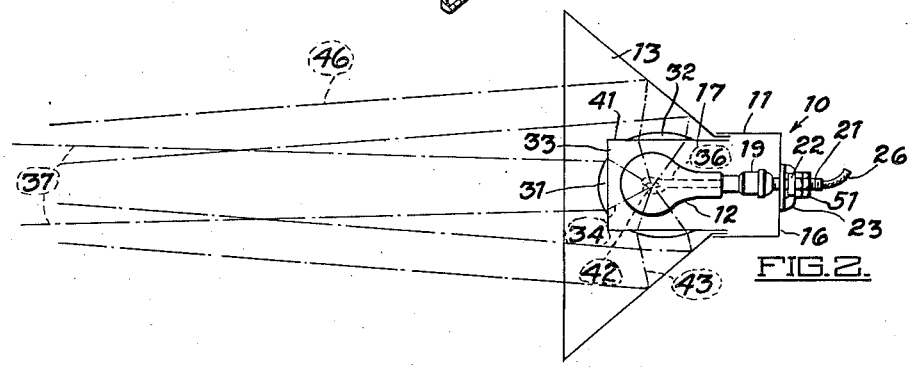
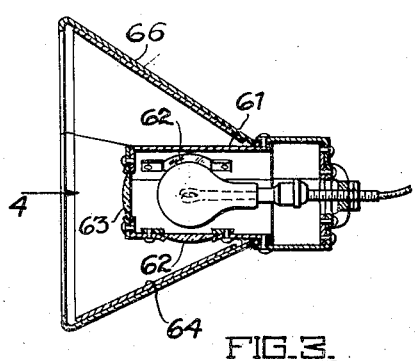
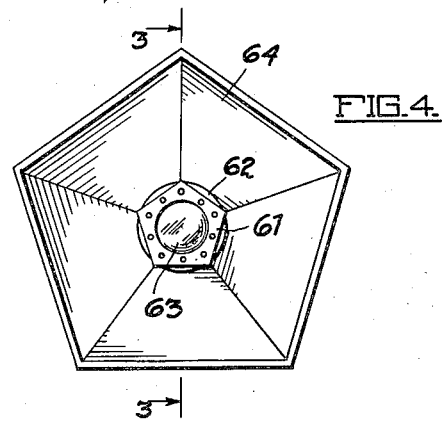
INVENTOR
EDWARD L. COLE
BY
ATTORNEY

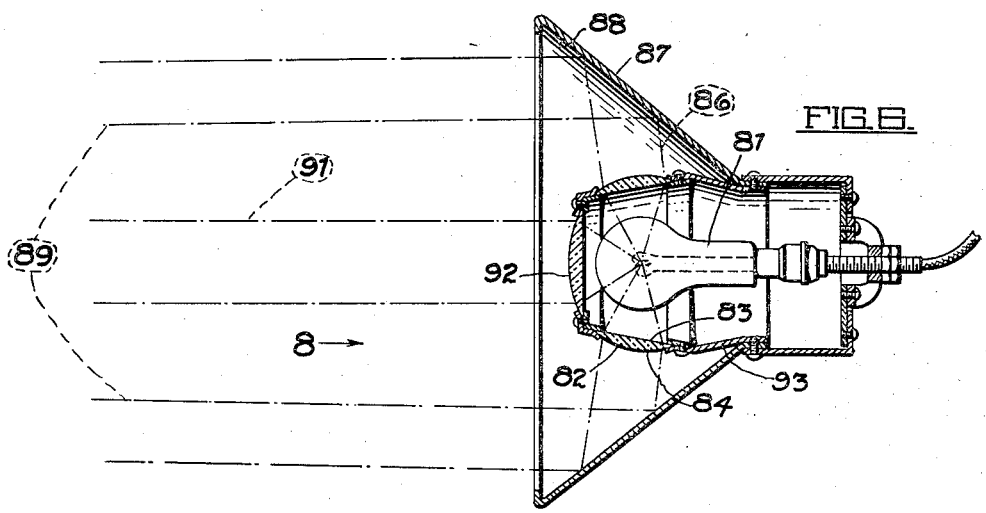
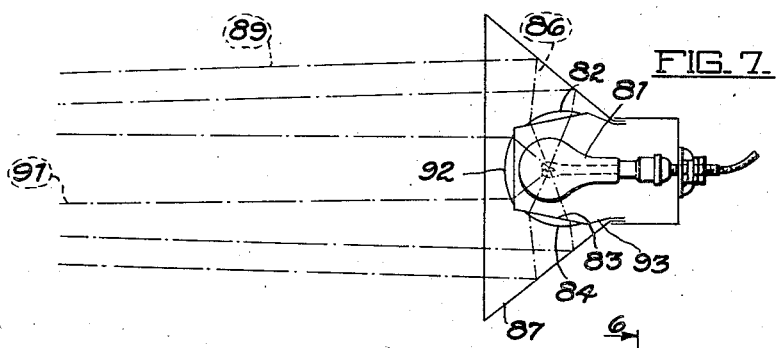
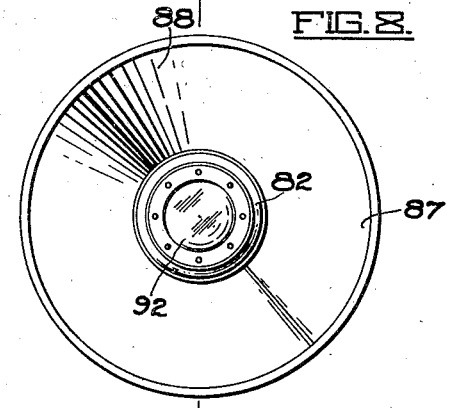
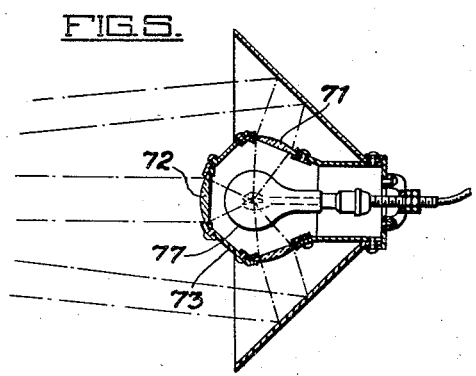
INVENTOR
EDWARD L. COLE
BY
ATTORNEY

Patented Sept. 10, 1935

2,014,039

UNITED STATES PATENT OFFICE 2,014,039

LIGHT CONTROLLING APPARATUS

Edward L. Cole, Los Angeles, Calif., assignor of thirty-seven and one-half per cent to Arthur C. Cole, Inglewood, Calif., and twenty-five per cent to Harry Boville, Los Angeles, Calif.

Application May 5, 1934, Serial No. 724,087

1 Claim. (Cl. 240—41.3)

My present invention relates to the art of illumination, and more particularly to devices for controlling light rays emanating from a light source.

An object of this invention is to provide improved type of construction of light projector of the general class indicated whereby a high degree of illuminating efficiency is attained through the expedient of a plurality of condensing lenses placed at predetermined locations about a suitable light source, each of which is adapted to gather a group of the rays diverging from the source and to refract them into more nearly parallel paths. Then by the correct positioning of suitable reflecting means in relation to each of the beams of light so developed, they all can be directed in a common direction or in other predetermined relationship to each other, far more accurately and with much less loss of dispersed light energy than can be attained in devices which do not provide for the collection of the divergent rays into more nearly parallel paths prior to their impingement against a reflector.

A more detailed object is to provide a light controlling device as above described embodying improved constructional details whereby is attained a device which will be relatively simple and inexpensive to construct, capable of facile and economical installation, which requires practically no servicing whatsoever after having been installed, and which, by reason of its high efficiency in controlling the direction of emanation of rays from the light source, can be relied upon to attain a given degree of illumination at an absolute minimum of cost by making it possible to use a light source of lower power than would otherwise be necessary to attain the same degree of illumination.

The invention possesses other objects and advantageous features, some of which, with those enumerated, will be set forth in the following description of the invention's particular embodiments which are illustrated in the drawings accompanying and forming a part of the specification. The forms of construction herein disclosed have proven in actual use to be highly efficient in operation, economical in construction, installation, and operation, and generally desirable in other respects. For these reasons, the details herein described may be considered as preferred. It should be mentioned, however, that while these details are specifically described hereinafter, they are to be considered merely as exemplary, and that variation of the described forms may be effected within the scope of the appended claim without departing from the essence of the invention.

Referring to the drawings:

Figure 1 is a longitudinal, vertical, medial sectional view of a light-controlling device embodying the principles of the present invention.

Fig. 2 is a diagrammatic view of the apparatus illustrated in Fig. 1, showing it adjusted differently to produce a different lighting effect.

Fig. 3 is a view similar to Fig. 1, but showing a modified construction of illuminator. The plane of section can be considered as having been taken upon the line 3—3 of Fig. 4 with the direction of view as indicated by the arrows.

Fig. 4 is a view looking into the open end of the illuminator of Fig. 3, the direction of view being indicated by the arrow 4.

Fig. 5 is another view similar to Fig. 1, showing another modification of my illuminator.

Fig. 6 is another view similar to Fig. 1, illustrating still another modified form. This figure can be considered as a sectional view taken upon the line 6—6 of Fig. 8.

Fig. 7 is a diagrammatic view of the apparatus shown in Fig. 6. Here again the illuminator is adjusted differently to obtain illumination of a different character.

Fig. 8 is a view looking into the open end of the device illustrated in Fig. 6, the direction of view being indicated by the arrow 8.

One form of my improved light projecting apparatus is shown in Figures 1 and 2, which illustrate the light controlling device 10 as comprising a substantially tubular lamp housing 11, within which any suitable source of light, such as an incandescent bulb 12 is disposed, and a shade 13, the inner surface of which is made highly reflective, either by applying silvering, chrome plating, or the like directly to the inner surface of the shade 13, or by mounting mirrors 14 thereupon. Preferably the lamp housing 11 is composed of two parts 16 and 17 rigidly secured together as by rivets 18. The outer part 16 accommodates the socket 19 for the lamp 12, which is mounted within the housing 11 for adjustment longitudinally thereof through the expedient of an elongated nipple 21 having a running thread engaging with and extending through the hub 22 of a spider 23 which is rigidly secured to the outer end of the outer part 16 of the lamp housing 11 as by rivets 24. Preferably the conductors 26 whereby the lamp 12 is energized lead to the socket 19 through the nipple 21 which may be of tubular form for their accommodation.

The inner part 17 of the lamp housing 11 is provided with a plurality of condensing lenses 31, 32, one of which is mounted in the end wall 33 preferably in such position that the axis of the lens coincides with the longitudinal axis of the lamp housing 11. Hence, the front lens 31 serves to intercept rays 34 diverging outwards from the filament 36 of the lamp 12 and refract them substantially into parallelism with each other, i. e., into a condensed beam such as indicated at 37, which is projected from the illuminating device in a direction straight forwards with respect thereto.

The other lenses 32 are mounted in the side walls 41 of the inner or forward part 17 of the lamp housing 11, surrounding the lamp 12 at the sides thereof.

Preferably the parts are so proportioned and arranged that the focuses 42 of all of the lenses 31 and 32 lie substantially at a common point within the housing so that the lamp 12 can be positioned with its filament 36 accurately at the focuses of all the lenses and thereby derive the most nearly completely condensed beams to be projected by each lens, including the side lenses 32 as well as the front lens 31.

In the modification illustrated in Figures 1 and 2, the plane of each of the side lenses 32 is substantially perpendicular to that of the front lens 31, the result being that when the lamp 12 is placed in its position of most accurate focus, i. e., with its filament at the focuses of all the lenses 31 and 32, the beams 43 projected by the several side lenses 32 radiate outwards in divergent directions from the housing 11, but each of them being substantially perpendicular to the beam 37 from the front lens 31.

For each of the side lenses 32, a flat reflecting surface is provided, in the present modification a mirror 14 being secured to the inner surface of the shade 13 opposite each of the side lenses 32. The angle between the plane of each mirror 14 and the longitudinal axis of the illuminating device is preferably slightly less than 45°, with the result that when the lamp 12 is positioned accurately with its filament at the focuses of the lenses, the beams 46 reflected by the mirrors 14 converge slightly toward each other and toward the beam 37 from the front lens 31, this condition being exaggerated in Fig. 1. In this manner a relatively large amount of light energy can be concentrated on a given spot at a considerable distance from the illuminator, this distance depending upon the angularity of the mirrors with respect to the axis of the device. However, a less concentrated light can be projected onto a larger field by adjustment of the socket 19 to move the lamp 12 toward or away from the front lens 31, this being accomplished by rotating the nipple 21 with respect to the spider 23 as will be readily understood. Obviously, such movement of the lamp 12 displaces the filament 36 from the focus 42 of the front lens, the result being that the ray 37 will spread more and over a larger field with a less concentrated light, as illustrated in Figure 2. However, the distance between the filament and each of the side lenses 32 is not varied greatly, because the lamp moves substantially in parallelism with the planes of these lenses. Hence, the beams 43 will not be thrown out of focus nearly as much as will the beam 37; they will, however, be projected toward their several mirrors 14 at different angularity therewith, and the beams 46 reflected by the mirrors will have altered directions. For example, if the lamp be moved closer to the front lens 31, as in Figure 2, the angle between each beam 43 and its mirror 14 will be increased, and since the angle of reflection of light is always equal to the angle of incidence, the angle between the mirror and the reflected beam also will be increased, thus causing the beams 46 to cross each other and the central beam 37 before they reach the distance from the projector at which they previously converged. Hence, if the field be the same distance from the illuminator as before alteration of the adjustment, a larger field will be illuminated by the central beam 37, and surrounding this field, and/or disposed inside this field adjacent the periphery thereof will be a circle of areas illuminated by the beams 46. It should be explained, however, that instead of each of these areas being clearly defined and distinct from each other, they all tend to merge with each other and with the area illuminated by the central beam 37, and thus produce a flood of relatively evenly distributed but less intense light over an area larger than that illuminated by the device when accurately focused.

Substantially the same ultimate result is obtained if the lamp 12 be moved further from the front lens 31, the principal difference being, however, that instead of converging and crossing, before they reach the field to be illuminated the beams 46 will diverge slightly.

Lock nuts 51 on the nipple outside the lamp housing 11 provide simple means for releasably fastening the parts in adjusted position.

At least one of the lenses, preferably the front lens 31, is removable to permit inspection, replacement, and/or repairs of the light source. With this end in view, the means for attaching the lens preferably comprises a bezel 52 releasably retained in place by screws 53 or their equivalent. However, as the figures clearly indicate, the entire lamp housing 11 is substantially tightly closed with the exception of the aperture through which the nipple 21 extends, this aperture preferably being sufficiently larger than the nipple to permit ventilation of the interior of the housing so as to assist in dispersion of the heat given off from the light source. The tight closing of the housing is of importance from the standpoint of exclusion of dust, which otherwise would tend to collect upon the surface of the bulb 12 and the inner surfaces of the condensing lenses 31 and 32 and thus tend to impair the efficiency of light projection.

Whereas the modification thus far described includes four (4) side lenses 32 and consequently is provided with four mirrors 14 the shade 13 is square in cross section, as is also the lamp housing 11. However, Figures 3 and 4 illustrate a modified form of illuminator which employs a five-sided lamp housing 61, each side carrying a side lens 62 in addition to the front lens 63. There being a separate, flat mirror 64 for each of the side lenses 62, the shade 66 also is of pentagonal cross section.

Figure 5 illustrates a modification wherein the side lenses 71, instead of being positioned with their respective planes perpendicular to that of the front lens 72, are disposed further from the front of the lamp housing 73 as compared with the constructions previously described. Hence, in order to place them normal to lines radiating from the filament of the bulb 77, they are disposed in sloping position, as clearly shown in the figure.

Figures 6, 7 and 8 illustrate a still further modified form wherein instead of surrounding the lamp 81 with a plurality of circular condensing lenses as in the previously described forms, a single, annular lens 82 is employed, with the lamp 81 disposed at the center of the annulus, i. e., the ring-shaped lens surrounds the lamp, as the figures show. The inner surface 83 of the lens is flat, considered axially of the annulus, and the outer surface 84 is arcuate, or convex, so that in cross section taken along the axis of the annulus, each side of the lens has the appearance of a plano-convex lens. The lens 82 may be formed with its inner surface 83 cylindrical, or frusto-conical with its smaller end forwards (as illustrated), or frusto-conical with its larger end forwards, thus making this modification correspond respectively to those shown in Figures 1 and 2, Figures 3 or 4, or in Figure 5, it being understood that the angularity of the reflector will be selected to meet the requirements of the type of lens used.

When the annular condensing lens 82 is employed, instead of condensing light from the lamp 81 into a plurality of beams which radiate in several directions from the lamp housing, a circular sheet of light 86 is formed, and accordingly a frusto-conical shade 87 and reflector 88 (which in this case can most conveniently be provided by coating the inner surface of the shade 87 with suitable highly reflective material) should be used. The circular sheet 86 of light is reflected by the reflector 88 into a cone 89 of light which tapers substantially to a point where it merges with the beam 91 from the front lens 92, or it spreads outwards therefrom to illuminate a larger area, depending upon the adjustment of the lamp 81 within the lamp housing 93. Here again, however, instead of being clearly defined from the central beam 91 and this forming a ring of illumination surrounding the spot illuminated thereby, both the beam 91 and the cone 89 are found to be sufficiently diffused to merge with each other and thus present what otherwise would be classed as "spotty illumination."

I claim:

In a light projector, a lamp housing comprising an inner part and an outer part, said parts being of substantially tubular construction and one being an extension of the other, a shade flaring from the juncture of said inner and outer parts, means common to said inner and outer parts and to said shade for rigidly securing them together, means mounted in said outer part and adjustable axially of said housing for supporting a source of light, a light source mounted in said supporting means with its luminous portion disposed within said inner part, said light source being substantially completely enclosed within said housing, lens means in the side walls of said inner part and encircling said light source for refracting rays diverging toward the front and rear of said projector substantially into parallel planes to which the axis of said projector is perpendicular, reflector means carried by said shade for reflecting said refracted rays forwards from said projector, and a lens in the inner end of said inner part of said housing for refracting rays diverging forwards from said source into predetermined relation with said reflected rays.

EDWARD L. COLE.